H. STEVENS.
Safety-Valve.
No. 162,502.
Patented April 27, 1875.
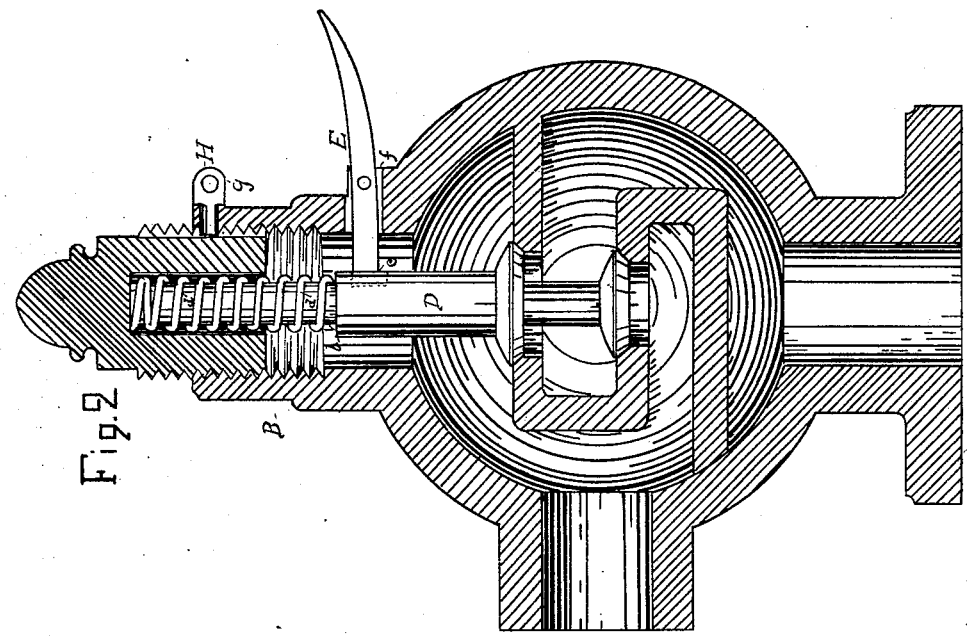
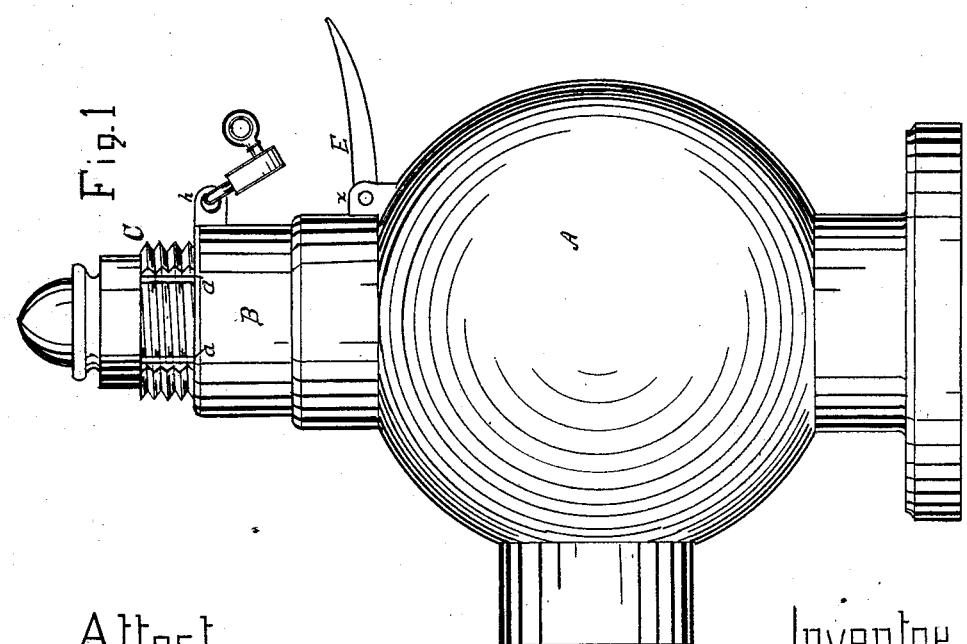
Attest.
C. D. Phelan
M. P. Harwood
Inventor.
Hiram Stevens
By Richard J. Baston
Att

UNITED STATES PATENT OFFICE.

HIRAM STEVENS, OF NEW HAVEN, CONNECTICUT.

IMPROVEMENT IN SAFETY-VALVES.

Specification forming part of Letters Patent No. 162,502, dated April 27, 1875; application filed February 6, 1874.

*To all whom it may concern:*

Be it known that I, HIRAM STEVENS, of New Haven, in the county of New Haven and State of Connecticut, have invented certain new and useful Improvements in Safety-Valves for Steam-Boilers; and I do hereby declare the following to be a full, clear, and exact description of the invention, such as will enable others skilled in the art to which it pertains to make and use it, reference being had to the accompanying drawings, which form part of this specification.

This invention relates to that class of safety-valves so constructed as to allow the valve to be set to open at any desired pressure, and then to be locked in that position; and its object is to so improve the safety-valve for which Letters Patent were granted to E. F. Steele February 10, 1874, that it may be employed as a lock-up valve for steam-boilers; and it consists in providing the adjusting-nut, by means of which the tension of the valve-spring is regulated, with one or more vertical grooves, into which enters a removable pin that passes through the shell of the valve, and is secured in position by a padlock, the hasp of which passes through an orifice in its outer end, and through corresponding holes in two lugs which project from the case.

In the accompanying drawings similar letters of reference indicate corresponding parts in the different figures.

Figure 1 represents a side view of the valve complete. Fig. 2 is a vertical section, and shows the arrangement of parts within the shell.

A is the shell or case, cast with the necessary partitions and openings, for the admission and direction of the steam in its passage through the valve. An elongated portion or neck, B, is provided with an internal screw-thread, into which the nut C forming the tension-regulator is screwed. This nut is provided with vertical grooves $a$ cut in its outer surface, and is bored out so as to admit the valve-stem and tension-spring, for which parts it also acts as a guide. The valve-stem D is encircled in its upper portion by a spiral spring, $d$, one extremity of which rests against a shoulder, $b$, of the stem, and the other against the bottom of the orifice in the nut C, thus not only forming the tension mechanism, but acting as a guide for the upper portion of the valve-stem. A recess is formed in the enlarged part of the valve stem, into which enters one end of the testing-lever E, which passes through an opening in the side of the case, and is pivoted between the lugs $f$.

It will be apparent that pressure, sufficient to overcome the tension of the spring, applied to this lever will raise the valves from their seats, thus affording a ready means of testing the condition of the valves, and preventing them from becoming fast in their seats, to which they are liable from various causes, such as corrosion of the metal of which they are formed, foaming of the water in the boiler, which often has upon its surface oily and other matter that, left in the valve, hardens and holds the parts together with great tenacity, requiring considerable power to force them asunder.

Another orifice in the shell at $g$ is placed between two projecting lugs, $h$, and admits the locking-pin H, which enters one of the longitudinal recesses $a$ in the nut C, and prevents the same from being turned in either direction, so as to increase or diminish the pressure of the spring upon the valve. The outer extremity of this pin is provided with an opening corresponding with a similar one in the projecting lugs $h$, and through which the hasp of a padlock or seal-lock is passed, thus allowing the valve to be set at any desired pressure, and effectually locked at that point, and at the same time furnishing a means of at all times raising the valves, so as to discover any adhesion of their surfaces.

It will be seen that this method of construction places a lock-up valve at the disposal of, and under the control of, the Inspector of Boilers, and at the same time gives to the engineer a means of raising the valve, and keeping it in proper working condition.

Having thus described my invention, I claim as new, and desire to secure by Letters Patent of the United States, the following:

The nut C, provided with the grooves $a$, in combination with the locking devices herein set forth, and for the purpose specified.

In testimony that I claim the foregoing I have hereunto set my hand this 2d day of February, 1874.

HIRAM STEVENS.

Witnesses:
SAMUEL R. BLATCHLEY,
HENRY E. PARDEE.